United States Patent
Chu et al.

(10) Patent No.: US 9,904,937 B2
(45) Date of Patent: Feb. 27, 2018

(54) METHOD AND SYSTEM FOR CONTINUOUS, DYNAMIC, ADAPTIVE RECOMMENDATION BASED ON A CONTINUOUSLY EVOLVING PERSONAL REGION OF INTEREST

(71) Applicant: Vulcan, Inc., Seattle, WA (US)

(72) Inventors: John Chu, Bothell, WA (US); Robert Arnold, Bellevue, WA (US); Mark Malleck, Newcastle, WA (US); Stuart Graham, Kenmore, WA (US); Jeremy Calvert, Seattle, WA (US); Dennis Schneider, Auburn, WA (US)

(73) Assignee: Vulcan, Inc., Seattle, WA (US)

( * ) Notice: Subject to any disclaimer, the term of this patent is extended or adjusted under 35 U.S.C. 154(b) by 0 days.

(21) Appl. No.: 14/147,016

(22) Filed: Jan. 3, 2014

(65) Prior Publication Data

US 2014/0297415 A1  Oct. 2, 2014

Related U.S. Application Data

(63) Continuation of application No. 11/901,282, filed on Sep. 14, 2007, now abandoned, which is a continuation-in-part of application No. 11/825,145, filed on Jul. 3, 2007, now Pat. No. 7,720,844.

(51) Int. Cl.
*G06F 17/30* (2006.01)
*G06Q 30/02* (2012.01)
*G01C 21/36* (2006.01)

(52) U.S. Cl.
CPC ..... *G06Q 30/0261* (2013.01); *G01C 21/3679* (2013.01)

(58) Field of Classification Search
None
See application file for complete search history.

(56) References Cited

U.S. PATENT DOCUMENTS

| | | | | |
|---|---|---|---|---|
| 7,421,344 | B1* | 9/2008 | Marsh et al. | 702/3 |
| 2002/0052674 | A1* | 5/2002 | Chang et al. | 700/300 |
| 2003/0100315 | A1* | 5/2003 | Rankin | 455/456 |
| 2004/0254723 | A1* | 12/2004 | Tu | 701/209 |

(Continued)

*Primary Examiner* — Syed Hasan
(74) *Attorney, Agent, or Firm* — Olympic Patent Works PLLC

(57) ABSTRACT

Embodiments of the present invention are directed to flexible, user-adapted, continuous searching, on behalf of a particular user, for points of interest relevant to the user's current location within a specifically computed personal region of interest. In a general case, the personal region of interest is computed as a function of the user's level of disposition towards the searched-for points of interest. The level of disposition towards the searched-for points of interest may, in turn, be based on two or more of the user's location, the current date and time, a history of the user's interaction with the POI-searching system, including user-initiated searches and user selections from displayed search results, a user profile developed for, and continuously updated on behalf of, the user, and a current context for the search, as specified by a search query or by other context-specifying means. The personal region of interest generally defines an abstract area, volume, or hypervolume within which method and system embodiments of the present invention search for points of interest.

14 Claims, 28 Drawing Sheets

(56) References Cited

U.S. PATENT DOCUMENTS

| | | |
|---|---|---|
| 2005/0038876 A1* | 2/2005 | Chaudhuri .................... 709/219 |
| 2006/0184313 A1* | 8/2006 | Butler ........................... 701/200 |
| 2007/0281690 A1* | 12/2007 | Altman et al. ............. 455/435.1 |
| 2008/0076451 A1* | 3/2008 | Sheha et al. ................ 455/456.3 |
| 2008/0097966 A1* | 4/2008 | Choi et al. ........................ 707/3 |
| 2008/0167801 A1* | 7/2008 | Geelen et al. ................ 701/201 |
| 2008/0268876 A1* | 10/2008 | Gelfand et al. ............... 455/457 |

\* cited by examiner

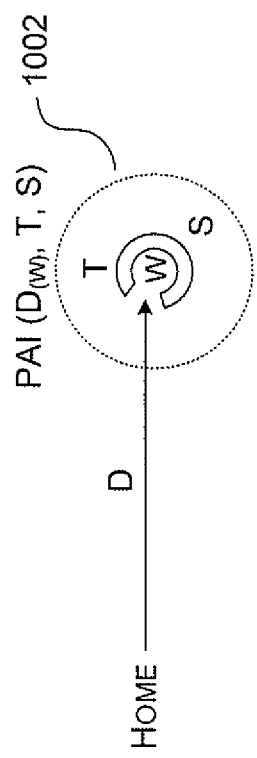
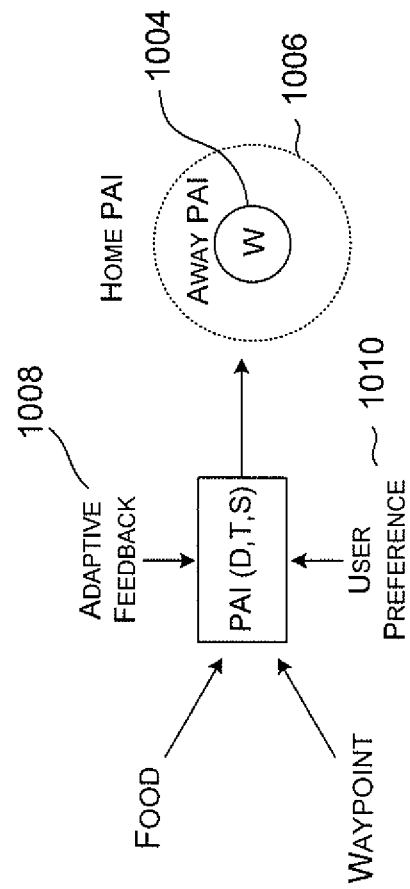
Figure 10A
Figure 10B

| Mark's Contact | Relationship Factor |
|---|---|
| Joe | Friend |
| Tammy | Acquaintance |
| Tim | Buddy |
| Brian | Enemy |
| Jane | Colleague |

Figure 11B

| Joe's Contact | Relationship Factor |
|---|---|
| Mark | Colleague |
| Bilbo | Buddy |

Figure 11C

| Relationship Factor | Disposition Weight |
|---|---|
| Enemy | -10 |
| Acquaintance | -3 |
| Colleague | 0 |
| Friend | 2 |
| Family/Buddy | 4 |

Figure 11D

| Distance from Home (in mi) | Joe's Base Disposition (to meet a contact) | Mark's Base Disposition (to meet a contact) |
|---|---|---|
| 0 | 0 | 0 |
| 100 | 1 | 1 |
| 500 | 2 | 2 |
| 1000 | 4 | 3 |
| 1500+ | 6 | 5 |

Figure 11E

| Relationship Factor | Joe's Adjusted Disposition (to meet a contact in NY) |
|---|---|
| Enemy | 0 |
| Acquaintance | 3 |
| Colleague | 6 |
| Friend | 8 |
| Family/Buddy | 10 |

Figure 11F

| Relationship Factor | Mark's Adjusted Disposition (to meet a contact in NY) |
|---|---|
| Enemy | 0 |
| Acquaintance | 2 |
| Colleague | 5 |
| Friend | 7 |
| Family/Buddy | 9 |

Figure 11G

| Level-of-Disposition | Radius-of-Interest (in mi) |
|---|---|
| 0 | 0.2 |
| 1 | 3 |
| 2 | 7 |
| 3 | 10 |
| 4 | 17 |
| 5 | 25 |
| 6 | 32 |
| 7 | 44 |
| 8 | 50 |
| 9 | 56 |
| 10 | 63 |

Figure 11H

| Event | Location | Time spent at location (days) | Disposition Modifier |
|---|---|---|---|
| Contact | Manhattan | 0 | 0 |
| Contact | Manhattan | 7 | -1 |
| Contact | Manhattan | 21 | -2 |
| Contact | Manhattan | 60 | -3 |
| Contact | Manhattan | 180+ | -4 |

Figure 11I

| Category of Interest | Restaurant | Genre |
|---|---|---|
| If-I-must | Any | Fast-food |
| Adventurous | Any | Local speciality |
| Recommended | Any | Any |
| Favorite | Todai | Japanese |

Figure 12B

| Category of Interest | Disposition Weight |
|---|---|
| If-I-must | -2 |
| Adventurous | 0 |
| Recommended | 2 |
| Favorite | 4 |

Figure 12C

| Distance from Home (in mi) | Base Disposition (search for food) |
|---|---|
| 0 | 6 |
| 100 | 5 |
| 500 | 3 |
| 1000 | 2 |
| 1500+ | 1 |

Figure 12D

| Category of Interest | Joe's Adjusted Disposition (search for food in NY) |
|---|---|
| If-I-must | 0 |
| Adventurous | 1 |
| Recommended | 3 |
| Favorite | 5 |

Figure 12E

| Level-of-Disposition | Radius-of-Interest (walking in ft) | Radius-of-Interest (driving in mi) |
|---|---|---|
| 0 | 50 | 0.5 |
| 1 | 250 | 1.5 |
| 2 | 500 | 3.0 |
| 3 | 800 | 5.0 |
| 4 | 1100 | 7.0 |
| 5 | 1500 | 9.5 |
| 6 | 1900 | 12.0 |
| 7 | 2350 | 15.0 |
| 8 | 2800 | 18.0 |
| 9 | 3300 | 22.0 |
| 10 | 3800 | 26.0 |

Figure 12F

| Event | Location | Time spent at location (days) | Disposition Modifier |
|---|---|---|---|
| Food | Manhattan | 0 | 0 |
| Food | Manhattan | 1 | 2 |
| Food | Manhattan | 2 | 4 |
| Food | Manhattan | 3+ | 5 |

Figure 12G

| Category of Interest | Wish List |
|---|---|
| Nice-to-have | Rabbit's Food |
| Hard-to-find | Ming-Dynasty Vase |
| Got-to-have | Mona Lisa |

Figure 13B

| Distance from Home (in mi) | Base Disposition (search for collectible) |
|---|---|
| 0+ | 5 |

Figure 13D

| Category of Interest | Mark's Adjusted Disposition (search for collectible in NY) |
|---|---|
| Nice-to-have | 5 |
| Hard-to-find | 7 |
| Got-to-have | 10 |

Figure 13E

| Level-of-Disposition | Radius-of-Interest (in mi) |
|---|---|
| 0 | 0 |
| 1 | 3 |
| 2 | 6 |
| 3 | 10 |
| 4 | 15 |
| 5 | 20 |
| 6 | 25 |
| 7 | 34 |
| 8 | 49 |
| 9 | 74 |
| 10 | 105 |

Figure 13F

| Event | Location | Time spent at location (days) | Disposition Modifier |
|---|---|---|---|
| Collectible | Manhattan | 0+ | 0 |

Figure 13G

| Traffic Condition | Modifier |
|---|---|
| Green | +3 |
| Yellow | +1 |
| Red | -2 |
| Black | -5 |

| Weather Condition | Modifier |
|---|---|
| Sunny | +3 |
| Overcast | +1 |
| Drizzle | -1 |
| Rain | -3 |
| Torrential Rain | -5 |

Figure 14C

| Event | LoD |
|---|---|
| Auction of collectibles in upper Manhattan | 10 |
| Joe is in upper Manhattan | 7 |
| Eat at Todai in Manhattan | 5 |
| Local specialty (Italian) in Midtown | 3 |
| Fast food next to the hotel | 0 |

Figure 15A

| Event | Status | LoD |
|---|---|---|
| Auction of collectibles in upper Manhattan | Open | 10 |
| Joe is in upper Manhattan | Closed | 7 |
| Eat at Todai in Manhattan | Offline | 5 |
| Local specialty (Italian) in Midtown | Closed | 3 |
| Fast food next to the hotel | Closed | 0 |

Figure 15B

| Event | Status | LoD |
|---|---|---|
| Joe is in upper Manhattan | Online | 7 |
| Local specialty (Italian) in Midtown | Open | 3 |
| Todai in lower Manhattan | Open | 5 |
| Auction of collectibles in upper Manhattan | Closed | 10 |
| Fast food next to the hotel | Open | 0 |

Figure 15C

METHOD AND SYSTEM FOR CONTINUOUS, DYNAMIC, ADAPTIVE RECOMMENDATION BASED ON A CONTINUOUSLY EVOLVING PERSONAL REGION OF INTEREST

CROSS-REFERENCE TO RELATED APPLICATION

This application is a continuation of application Ser. No. 11/901,282, filed Sep. 14, 2007, which is a continuation-in-part of U.S. Pat. No. 7,720,844, issued May 18, 2010.

TECHNICAL FIELD

The present invention is related to personalized search methods and systems and, in particular, a method and system for providing personalized recommendations based on continuously evolving regions of interest.

BACKGROUND OF THE INVENTION

Search techniques are the cornerstone of information retrieval in many different information-distribution environments and problem domains. For example, search methods based on card catalogs and the Dewey Decimal System provided the foundation for library research for many decades prior to the advent of cheap personal computers. For a significant period of time, dial-up information systems were the primary searching tool available for scientific and medical researchers. Currently, Internet search engines are among the most frequently used and highest-revenue-generating tools provided on the Internet, and electronic searching is being incorporated into an ever-increasing number of different electronic devices, from automobile navigation systems to cell phones.

One increasingly widely available information-retrieval method offered to users of various electronic devices involves locating points of interest ("POIs") with respect to a user's current location, as specified by the user or as detected by global positioning services ("GPS") devices incorporated into the electronic devices, including automobile navigation systems, cell phones, personal digital assistants, mobile personal computers, and other electronic devices. FIGS. 1A-C illustrate and example of currently available location-based POI searching. In this example, as shown in FIG. 1A, the user's current location is indicated by a graphical object 102 superimposed on a street map. Next, as shown in FIG. 1B, a radius 104 with an endpoint coincident with the user's current location specifies a disk-like search area 106 within which the user wishes to locate points of interest. The radius 104 may be specified by the user or may be a default distance value incorporated into the location-based POI search system. As shown in FIG. 1C, the location-based POI search system then finds and displays the locations of a class of points of interest specified by the user. For example, in FIG. 1C, the user has specified, through a text query or through interaction with a user interface, a desire to find gift-card shops proximal to the user's current location. The location-based POI search system has located and displayed the locations of three gift-card shops 108-110. Although the display formats, query inputs, and other features and characteristics of various location-based POI search systems vary, currently available location-based search systems essentially display a map for a region that includes a user's location and that is annotated with points of interest corresponding to a search query or, alternatively, may provide a list of POIs and corresponding addresses and/or travel directions.

FIG. 2 illustrates the data components of the location-based POI search system described above, with reference to FIGS. 1A-C. The location-based POI search system employs a map database 202 as well as a points-of-interest database 204. These two database components, along with software-encoded logic for receiving, parsing, and executing search requests and displaying search results, enable location-based POI search queries to be fielded from, and location-based POI search results to be returned to, users of a large number of different types of electronic devices, from personal computers to automotive navigation systems and cell phones.

FIG. 3 is a simple control-flow diagram that illustrates logical steps executed by a generalized, currently-available location-based POI search system, such as the location-based POI search system discussed above, with reference to FIGS. 1A-C. In step 302, a location is received from a user, either specified by the user through a user interface, or obtained via a GPS component or other location-determining component of an electronic device. Next, in step 304, a suitable map corresponding to the received location is searched for, and retrieved from, the map database, and indication of the user's location is superimposed on the map, as shown in FIG. 1A. Next, in step 306, a search query is received from the user. The search query may be typed into a user interface, selected from an icon display on a touch screen, or generated by other, similar means. Then, in step 308, the radius of the search area is obtained or determined. The radius of the search area may be specified by a user, or retrieved as a default value from memory or from a database. Then, in step 310, the POI database is accessed in order to identify relevant POIs and their corresponding locations within the search area, according to the specification of desired POIs represented by the received search query. Finally, in step 312, indications of the identified POIs within the search area are superimposed graphically onto the map and displayed to the user. Many of these steps may be combined together in various types of search systems, and, as discussed above, lists of POIs may be returned, rather than annotated maps.

Location-based POI searches provide great convenience and utility to users of various devices. However, the currently available POI search systems and methods, discussed above with reference to FIGS. 1-3, are associated with a number of deficiencies. First, currently available POI searching generally returns the same results to any user specifying a particular type of search. For example, a location-based search for sporting-goods stores would return the same result to a sophisticated professional athlete or professional team manager who has traveled to a city for an upcoming professional sporting event as returned a high-school student looking for a pair of sneakers close to home. The professional athlete or professional team manager would likely not be interested in general department stores with shoe depai intents that sell sneakers, while the high-school student likely would not be interested in a high-end store selling professional sports equipment. Moreover, the professional athlete or professional team manager may be willing to travel many miles for a necessary piece of equipment, while the high-school student might be willing to walk or ride a bus to a destination within a distance of no more than several miles from home. The resulting POI choices need to be contextually relevant to the current or projected conditions of the user. POI searches are not well-tailored to particular users, particular user's contexts, and particular user's circumstances, and generally return a large amount of unneeded and unappreciated information, while often not returning results that would be of great benefit to a particular user. For this reason, users of location-based POT search systems, designers and vendors of location-based POI-search software, and designers, manufacturers, and vendors of a wide variety of electronic devices that feature location-based POI searching have all recognized the need for location-based POI searching better adapted to particular users.

SUMMARY OF THE INVENTION

Embodiments of the present invention are directed to flexible, user-adapted, continuous searching, on behalf of a particular user, for points of interest relevant to the user's current or projected location within a specifically computed personal region of interest. In a general case, the personal region of interest is computed as a function of the user's level of disposition towards the searched-for points of interest. The level of disposition towards the searched-for points of interest may, in turn, be based on two or more of the user's current or projected location, the current date and time, a history of the user's location and interaction with the POI-searching system, including user-initiated searches and user selections from displayed search results, a user profile developed for, and continuously updated on behalf of, the user, and a current context for the search, as specified by a search query or by other context-specifying means. The resulting POI list is further refined based on a current or projected contextual relevance to the user. The personal region of interest generally defines an abstract area, volume, or hypervolume within which method and system embodiments of the present invention search for points of interest.

BRIEF DESCRIPTION OF THE DRAWINGS

FIGS. 10A-D illustrate the types of PAI, a special case of PRI, involved in three example points-of-interest searches.

FIGS. 11A-11I illustrate an exemplary contacts search.

FIGS. 12A-G illustrate an exemplary food-related POI search.

FIGS. 13A-G illustrate an exemplary collectibles-related POI search.

FIGS. 14A-C illustrates the concept of transient LoD modifiers to further refine contextual relevance.

FIGS. 15A-C illustrates an example of POI list refinement based on contextual relevance

DETAILED DESCRIPTION OF THE INVENTION

The present invention is directed to highly user-adapted, continuous, dynamic, and adaptive location-based POI searching methods and systems. Unlike currently available location-based POI searching methods and systems, method and system embodiments of the present invention maintain user profiles and user histories that constantly evolve through user interaction with the location-based POI-searching systems of the present invention. Location-based POI searching, according to method and system embodiments of the present invention, is based on a personal region of interest that is computed, on a search-by-search basis, from the values of various parameters and various types of stored data in different method and system embodiments of the present invention.

Figure 1A:
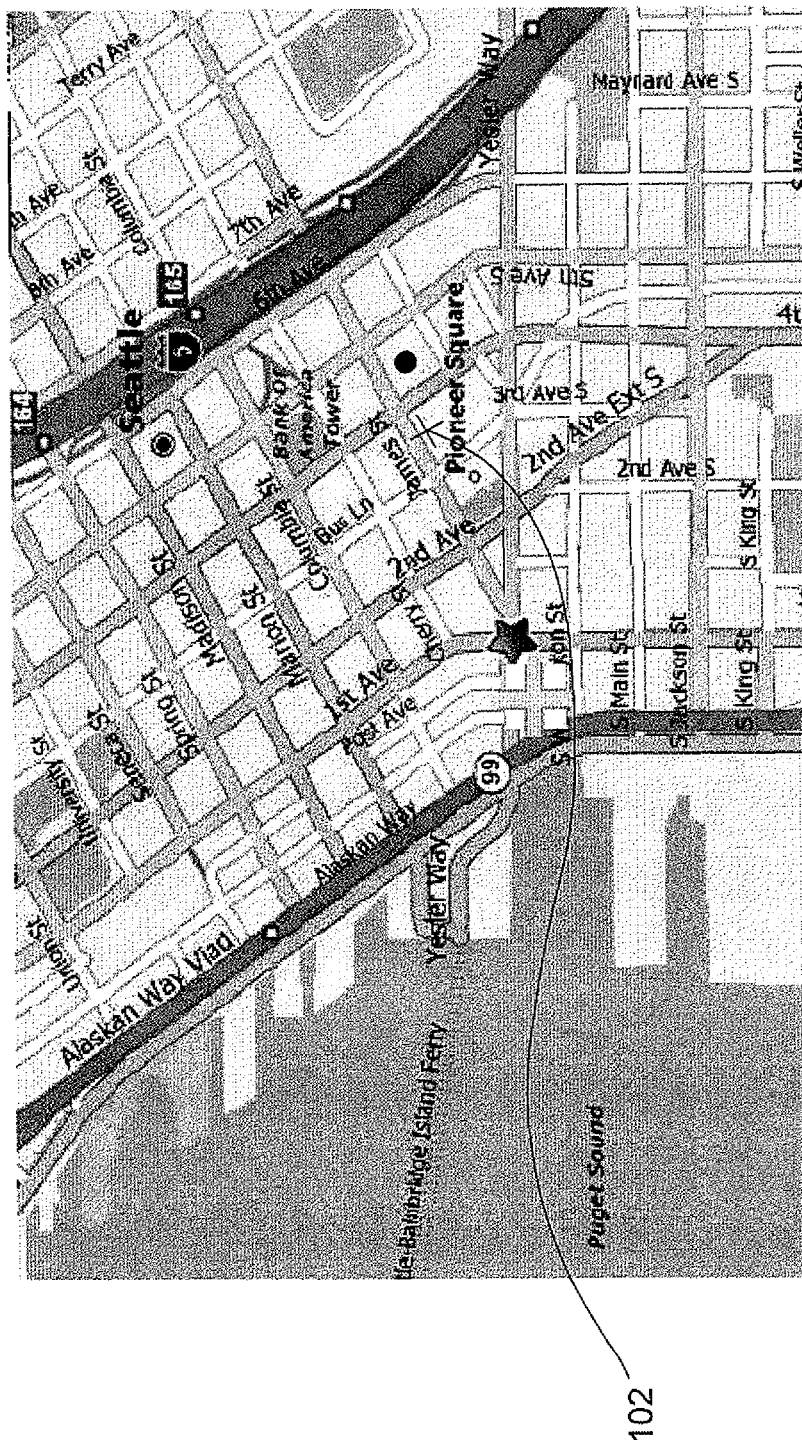
FIGS. 1A-C illustrate and example of currently available location-based POI searching.
Figure 1B:
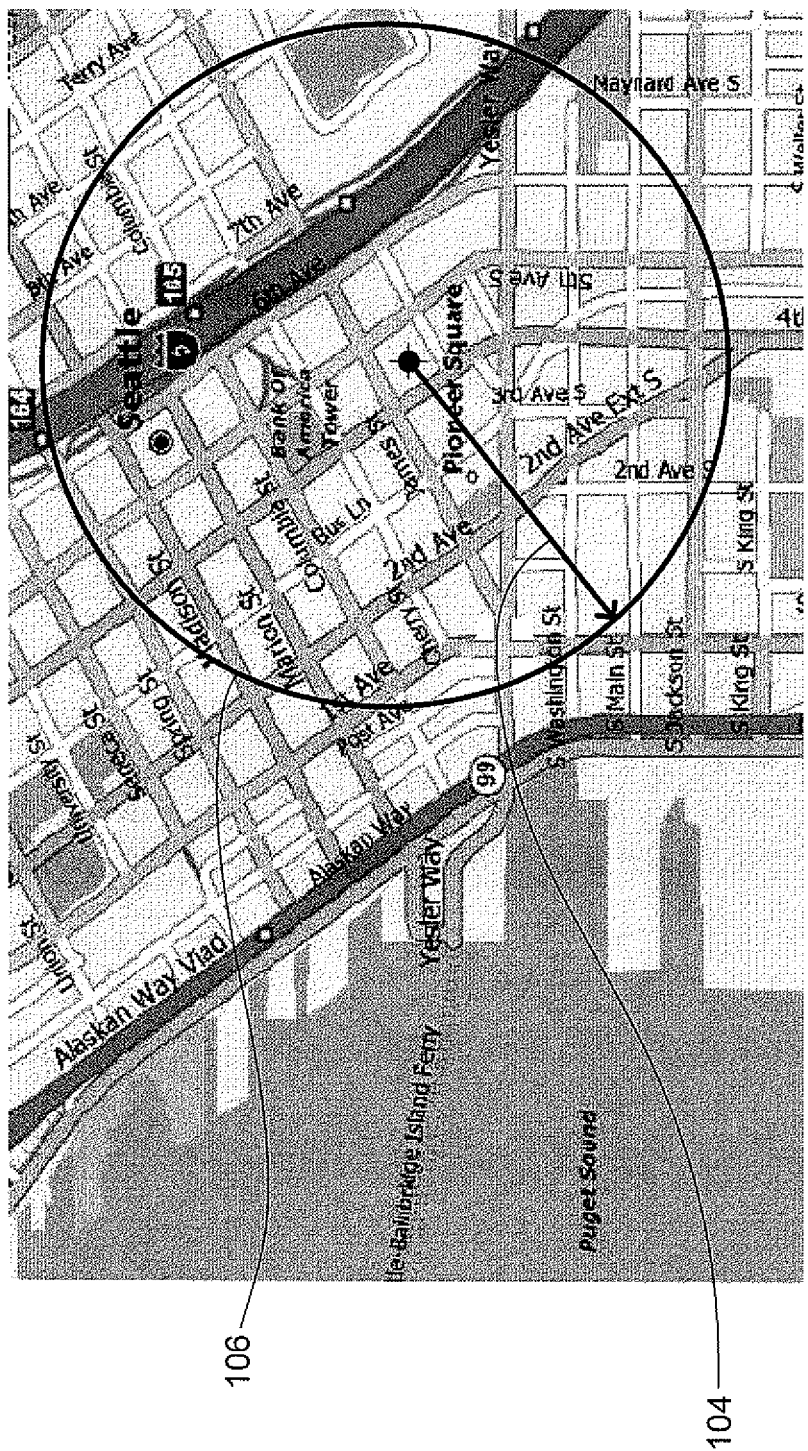
Figure 1C:
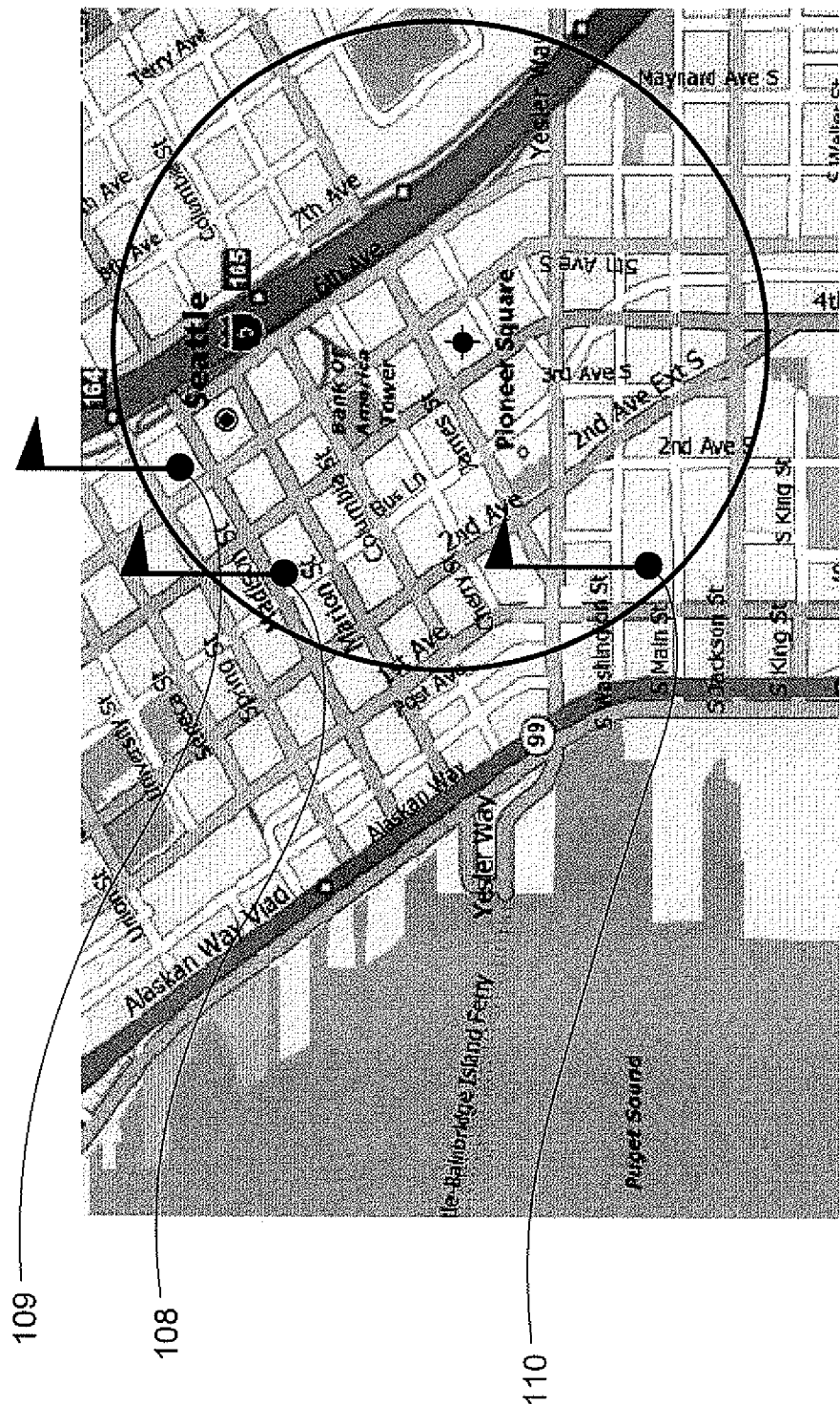
Figure 2:
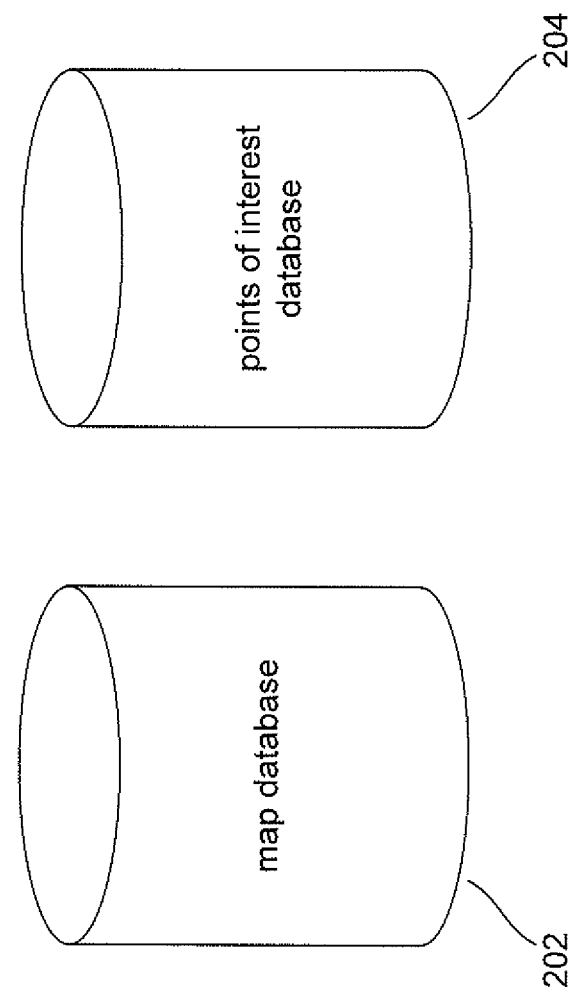
FIG. 2 illustrates the data components of the location-based search engine described above, with reference to FIGS. 1A-C.
Figure 3:
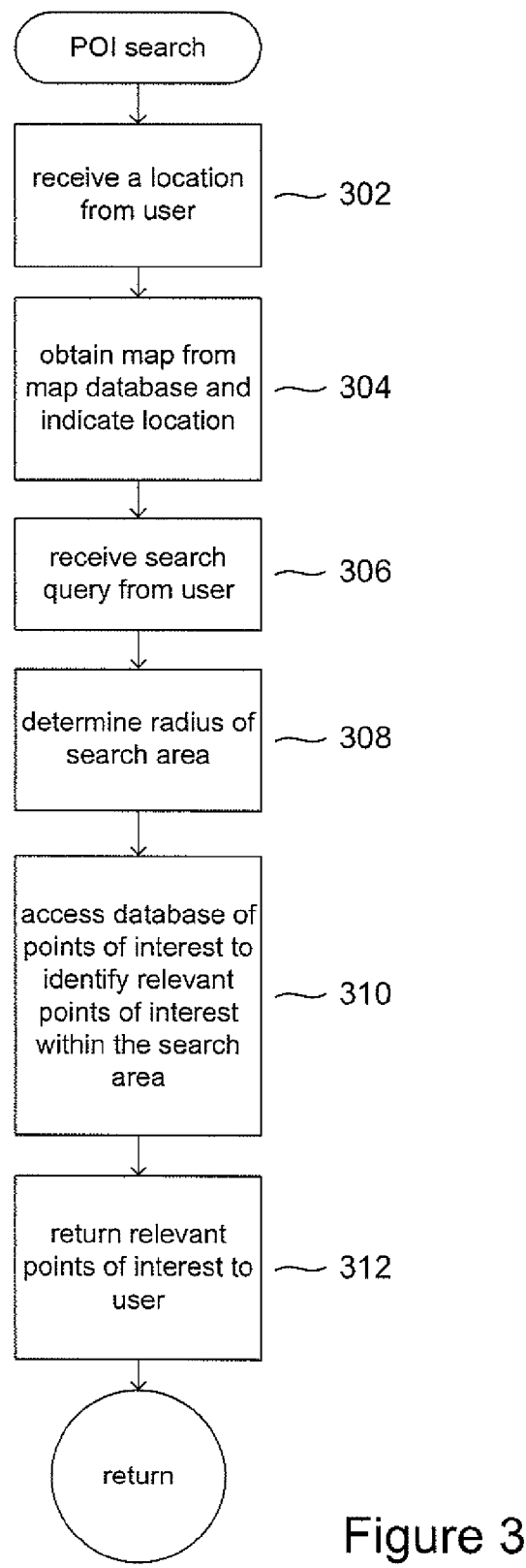
FIG. 3 is a simple control-flow diagram that illustrates logical steps in execution of a location-based POI search, such as the location-based POI search discussed above, with reference to FIGS. 1A-C.
Figure 4:
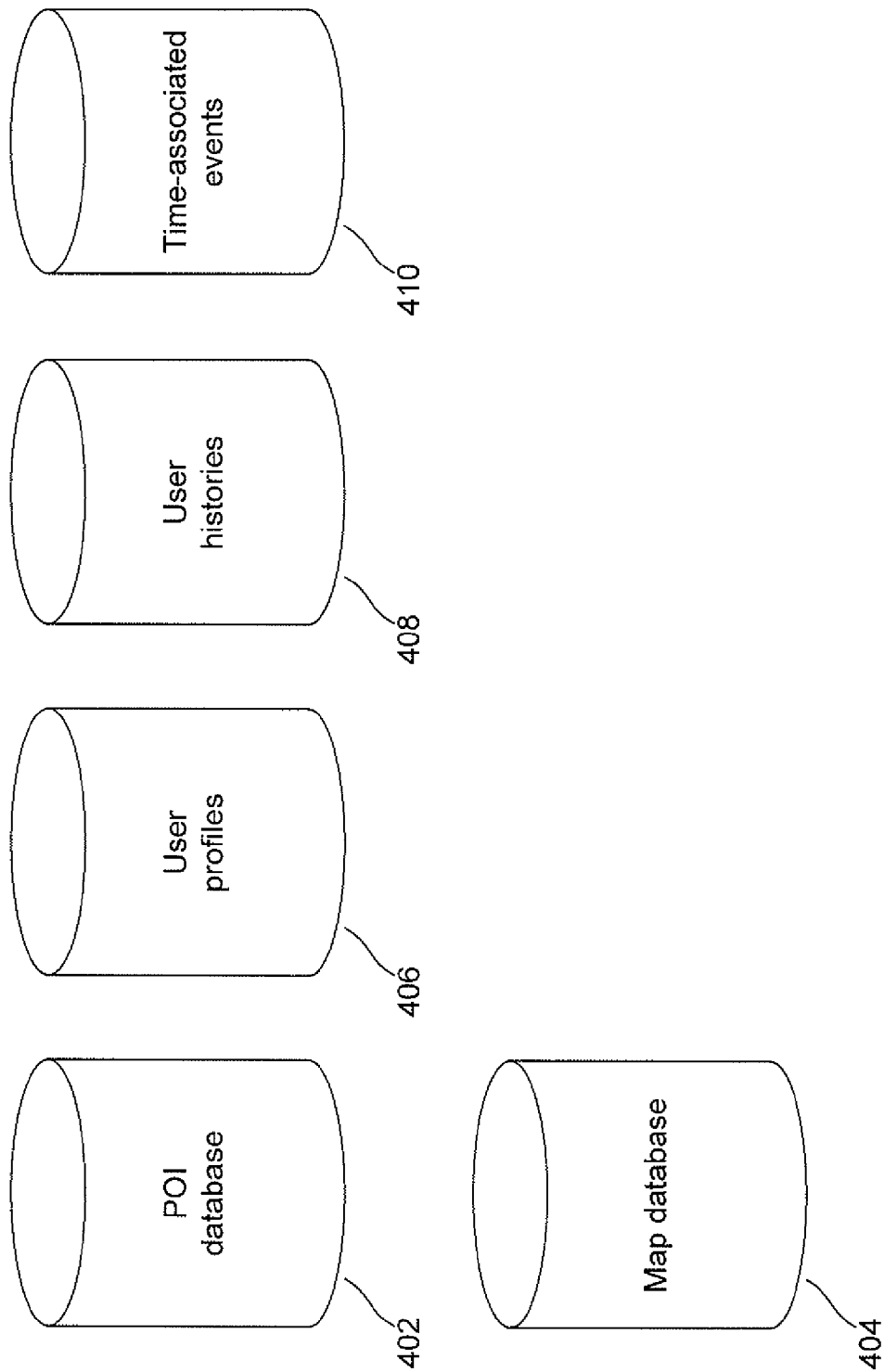
FIG. 4 illustrates database components of certain general method and system embodiments of the present invention.

In contrast to the two-database-component location-based POI searching described with reference to FIGS. 1-3, the general method and system embodiments of the present invention employ a greater number of data components and more sophisticated, software-implemented logic. FIG. 4 illustrates database components of certain general method and system embodiments of the present invention. The database components include a POI database 402 and a map database 404, as employed by currently available methods. However, general method and system embodiments of the present invention also employ a user-profiles database 406, a user-histories database 408, and a database of various time-associated events 410. The database components shown in FIG. 4 are not exhaustive. Additional database components may be employed in various embodiments of the present invention, and fewer database components may be employed in other embodiments of the present invention. Moreover, the database components are not necessarily separate databases, or discretely implemented, but may be implemented, for example, as different sets of tables in a single, extensive relational database, or may be implemented as two or more databases of various types residing locally or remotely. In addition, the types of stored information and databases, discussed above, may instead be obtained by secondary searching of various information sources, including the world-wide web, electronic information streams, and various types of broadcast information.

Figure 5:
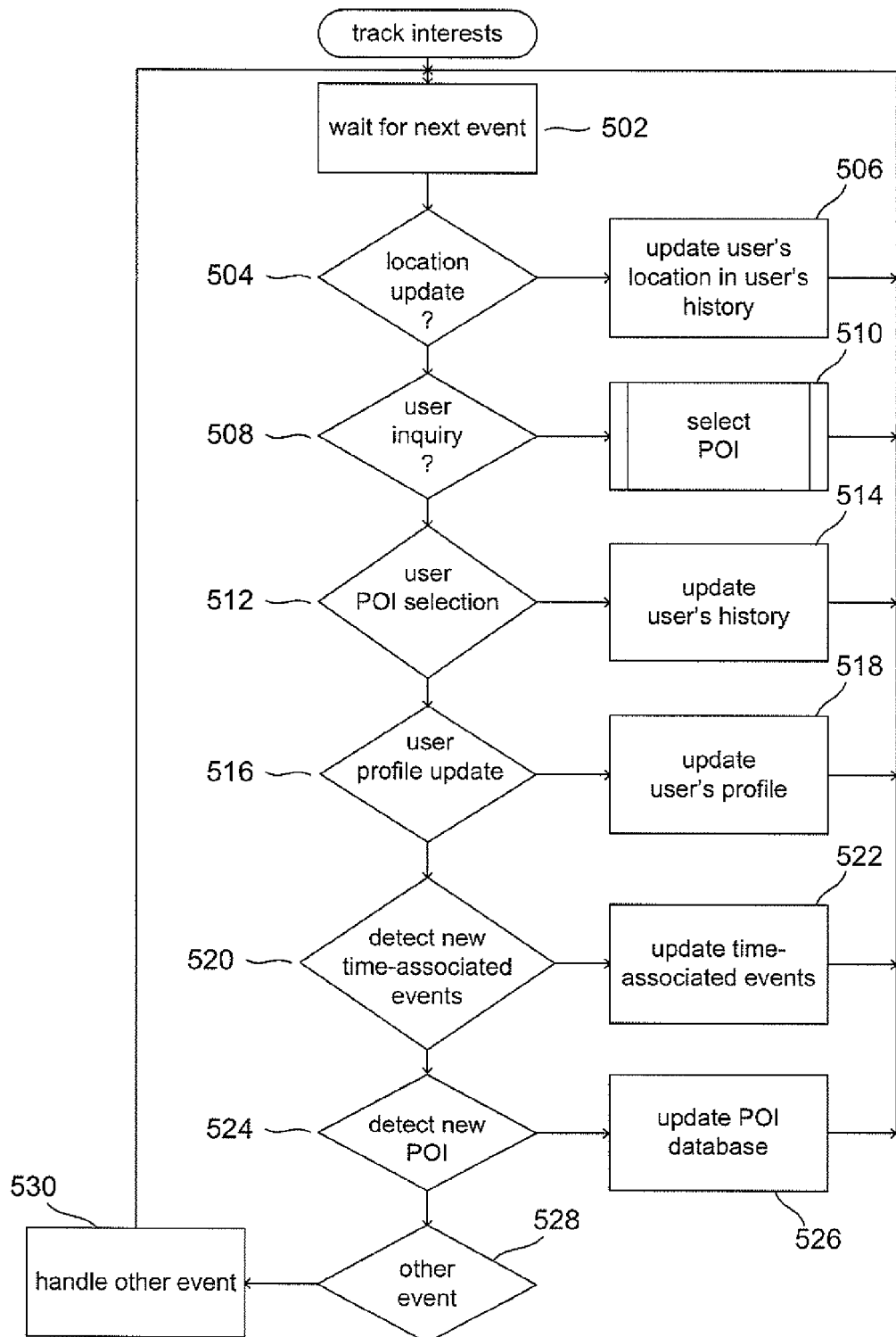
FIG. 5 is a control-flow diagram of the interests-tracking component of general method and system embodiments of the present invention with respect to a particular user.

In contrast to currently available methods, method and system embodiments of the present invention track users' interactions with search-system embodiments over time in order to track and continuously refine a stored representation of the users' interests with respect to a variety of different contexts. FIG. 5 is a control-flow diagram of the interests-tracking component of general method and system embodiments of the present invention with respect to a particular user. The control-flow diagram of FIG. 5 is represented as an endless loop, with user-interest tracking carried out continuously or at regular intervals as a user moves through, and interacts with, the user's environment and with the search system. In step 502, the interests-tracking method waits for a next event. When a next event occurs, the interest-tracking method determines what type of event has occurred, and responds accordingly. If a location-update event is detected, in step 504, then the user's current or projected location is updated, in step 506. The user's location may be stored in the user's history, or in some other database or data-storage location, including an electronic memory. If, instead, the detected event corresponds to a user inquiry or user search, as determined in step 508, then the routine "select POI" is called, in step 510. The routine "select POI" is discussed below, in greater detail. If the detected event corresponds to selection, by the user, of a displayed POI for additional information or other interaction, as determined in step 512, then the user's history is correspondingly updated, in step 514, so that, over time, the user's history can be employed to refine POI searches as well as to update and refine a user's profile, or, in other words, stored user's preferences. If the detected event is a user profile update, as determined in step 516, then the user's profile is updated, in step 518. A user may explicitly, through interaction with the system, specify or update preferences stored in the user's profile. Alternatively, a user-profile-update event may be generated as a result of other activities and events, including updates to a user's history or selection by a user of displayed results.

If the detected event corresponds to detection, by the system, of new time-associated events, as determined in step 520, then the time-associated-events database is updated in step 522. Just as the search system continuously or periodically tracks a user's location and monitors a user's interaction with the system, the search system also tracks various information sources in order to accumulate timely information about various events and occurrences that may be relevant to POI searching. As one example, POI searching for musical events may rely on continuous detection and updating of a calendar of musical events stored in the time-associated-events database. If the detected event is a new point of interest, as determined in step 524, then the POI database is updated in step 526. Just as the system continuously monitors information sources in order to detect a variety of different time-associated events, the system also monitors information sources in order to identify new points of interest for inclusion in the POI database. Any of various other events, detected in step 528, are accordingly handled in step 530. The interests-tracking method shown in FIG. 5 is carried out by system embodiments of the present invention on behalf of all users. Interests tracking, in turn, provides POI searches initiated by users, or automatically initiated due to detection of associated events, such as changes in users' current or projected locations, or various interactions of the user with the system, that are as specifically tailored to individual users as possible, so that the POI searches return current, up-to-date POI information, as constrained by the user's current preferences, accumulated history, and the up-to-date time-associated events stored in the time-associated-events database.

Figure 6:
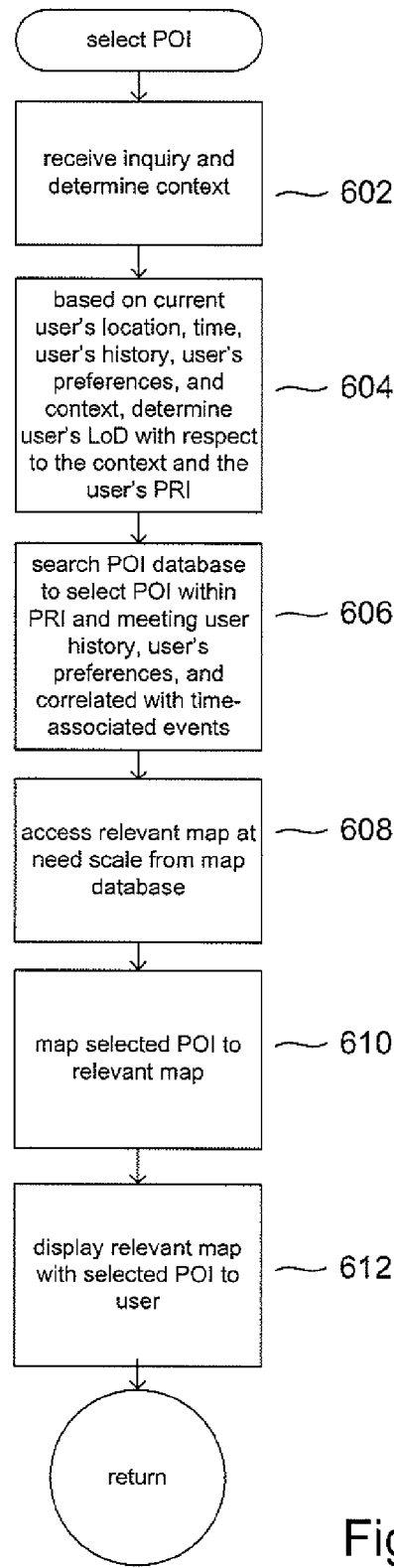
FIG. 6 is a control-flow diagram for the routine "select POI," called in step 510 of FIG. 5, which represents an embodiment of the present invention.

FIG. 6 is a control-flow diagram for the routine "select POI," called in step 510 of FIG. 5, which represents an embodiment of the present invention. In step 602, the routine "selectPOI" receives an inquiry from a user and determines a context for a POI search. The user may explicitly enter search criteria, through a user interface, may indicate search criteria through interaction with an icon-based, touch screen, or other such interactive system, or the search inquiry may be generated by other events, such as changes in the user's current or projected location, access by the user to various features of an electronic device, such as a cell phone, and may be triggered by other events and activities. A context is a collection of search-subject constraints and search-subject-related parameters associated with a search. A context may be largely derived from a search query, but may also be derived from additional information, including information stored for a user by the location-based POI search system.

In step 604, a personal region of interest ("PRI") is computed based on the user's level of disposition ("LoD"), in turn based on two or more of: (1) the user's current location; (2) the current time and date; (3) the user's location and POI selection history; (4) the user's preferences stored in the user's profile; (5) the context determined above in step 602; (6) a projected user location; (7) a future time and date; and (8) any of numerous other types of information relevant to computing the LoD with respect to the context for the search. Specific examples of LoDs and PRIs are discussed, below. Then, in step 606, the POI database is searched to select POIs within the computed PRI that meet various constraints embodied in the context, user's history, user's preferences, and as correlated with time-associated events. In step 608, the map database is accessed to retrieve a relevant map at a relevant scale. Then, in step 610, the retrieved POIs are mapped to the relevant map retrieved in step 608. Finally, the relevant map with indications of the selected POIs is displayed to the user in step 612. It is important to note that the PRI computed in step 604 is an abstract area, volume, or hypervolume, rather than a fixed, disk-like geographical area as computed by currently available methods, discussed above with reference to FIG. 113. Because the PRI is abstract, the PRI may not represent a simple, geometrical area or volume, such as the disk-shaped search area shown in FIG. 1B. In alternative embodiments of the present invention, results may be returned as lists of POIs along with addresses and/or travel directions, rather than as map annotations, or lists of POIs along with times and other relevant information for non-geographic POIs.

Figure 7:
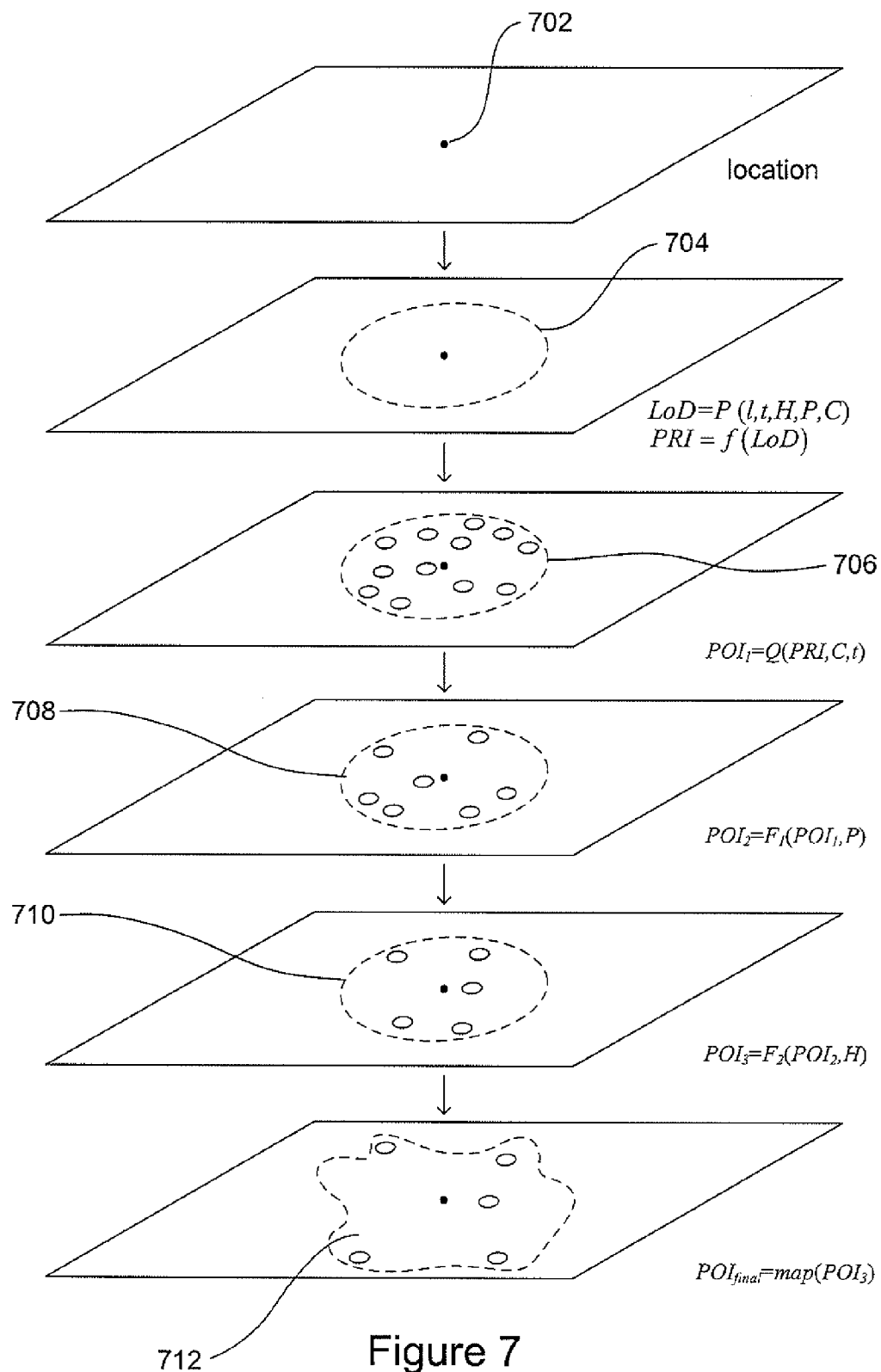
FIG. 7 graphically illustrates location-based POI searching according to various system and method embodiments of the present invention.

FIG. 7 graphically illustrates POI searching according to various system and method embodiments of the present invention. The POI searching begins with a user's location 702, either current or projected. The user's location is continuously monitored by the system as, for example, by continuously monitoring GPS or other location-determining-component signals produced by electronic equipment carried by the user. Alternatively, the user's location may be monitored by user interaction with various personal electronic devices, including personal computers, or by the user's interaction with various other devices, such as ATM machines, airport ticket machines, credit-card-processing machines, telephones, and other such devices. In other cases, the starting location may be a projected location, where the user will travel to at a future point in time. Next, a PRI 704 is computed from the user's LoD, the LoD computed from, in general, the user's location l, the current time and date t, the user's location and POI selection history H, the user's preferences P, and the search context C. The PRI is a fundamental constraint on POI searching. In certain instances, the LoD may be computed on fewer than the above-discussed number of input parameters, and in other embodiments of the present invention, additional input parameters may be used. The computed PM may then be populated by POIs obtained in an initial search based on the computed PM, the current context C, and the current time t 706. These initially selected POIs may then be filtered, as well as supplemented, based on the user's preferences 708 and on the user's history 710. In general, filtering decreases the number of POIs, although additional POIs may be added as a result of consideration of the user's preferences and histories. Finally, the POIs are mapped to geographical locations, in the case of geographically located POIs, or mapped to some other specified space 712. As an example of additional types of spaces, POIs may be searched for with respect to proximity in time, rather than, or in additional to, geographical location, and the selected POIs may be displayed along a timeline relative to the current time, rather than as geographical positions relative to the current user's location. In other cases, both location and time may be considered, and in still additional cases, various other parameters may be considered, including cost, product specification, associated features, and many other such considerations and dimensions.

Figure 8:
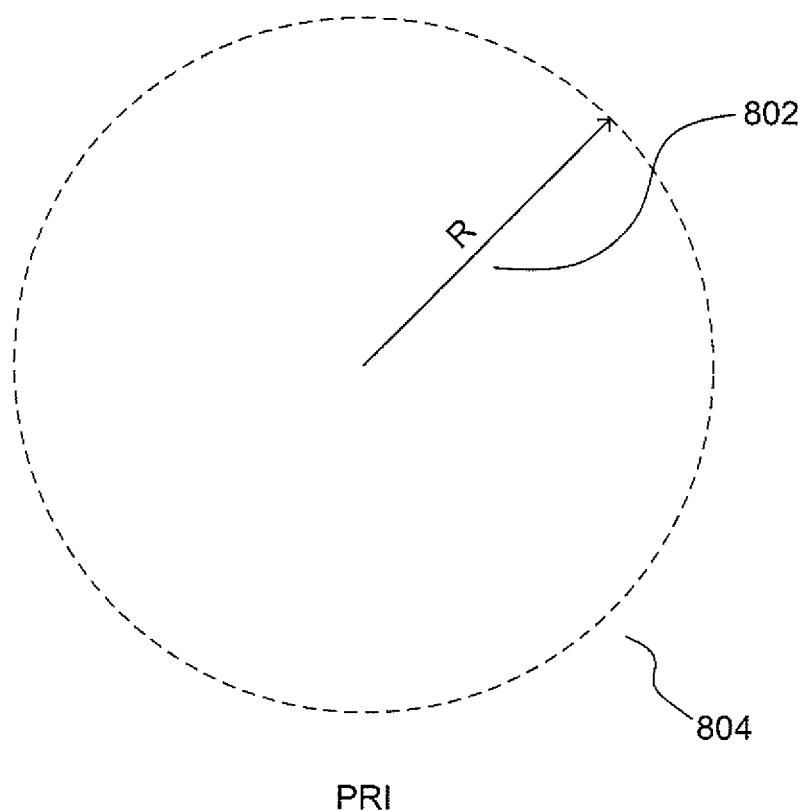
FIG. 8 shows a simple, disk-like-area representation of an PRI.

At an abstract level, a PM may be conceptually imagined to be a disk-shaped region specified by a radius. FIG. 8 shows a simple, disk-like-area representation of a PM. However, as noted above, a PM may be a computed volume, rather than an area, in cases where three-dimensional locations are relevant, or in cases where additional, non-geographic dimensions are employed. The PM may be a hyper-dimensional volume in a higher-dimensional space. Moreover, the radius 802 by which a PRI 804 is specified may represent a single constraint, such as distance, or multiple constraints, such as time and distance, distance and convenience, or many other such dimensions and/or considerations. As one example, a user currently located in a particular department, on a particular floor, of a multi-story department store or shopping mall may wish to search for points of interest within a three-dimensional volume proximal to the user's location, rather than a two-dimensional area on the floor on which the user is currently located. As another example, a user may wish to search for POIs within a certain distance of the user's current position as well as POIs reachable within some maximum amount of time, regardless of distance. These criteria may become quite complex. For example, the user may have separate time, distance, and convenience thresholds for different types of available transportation that, in turn, depend on the user's location. For example, the user may be willing to travel four miles or up to 15 minutes by subway, but only one-half mile and up to 20 minutes by foot.

In non-geographical spaces, a wide variety of different types of constraints may be employed to define a LoD from which a PRI is computed. For example, in a search for books on the Internet, the LoD may be defined by timeliness of shipping, publication date, and other such considerations.

Figure 9:
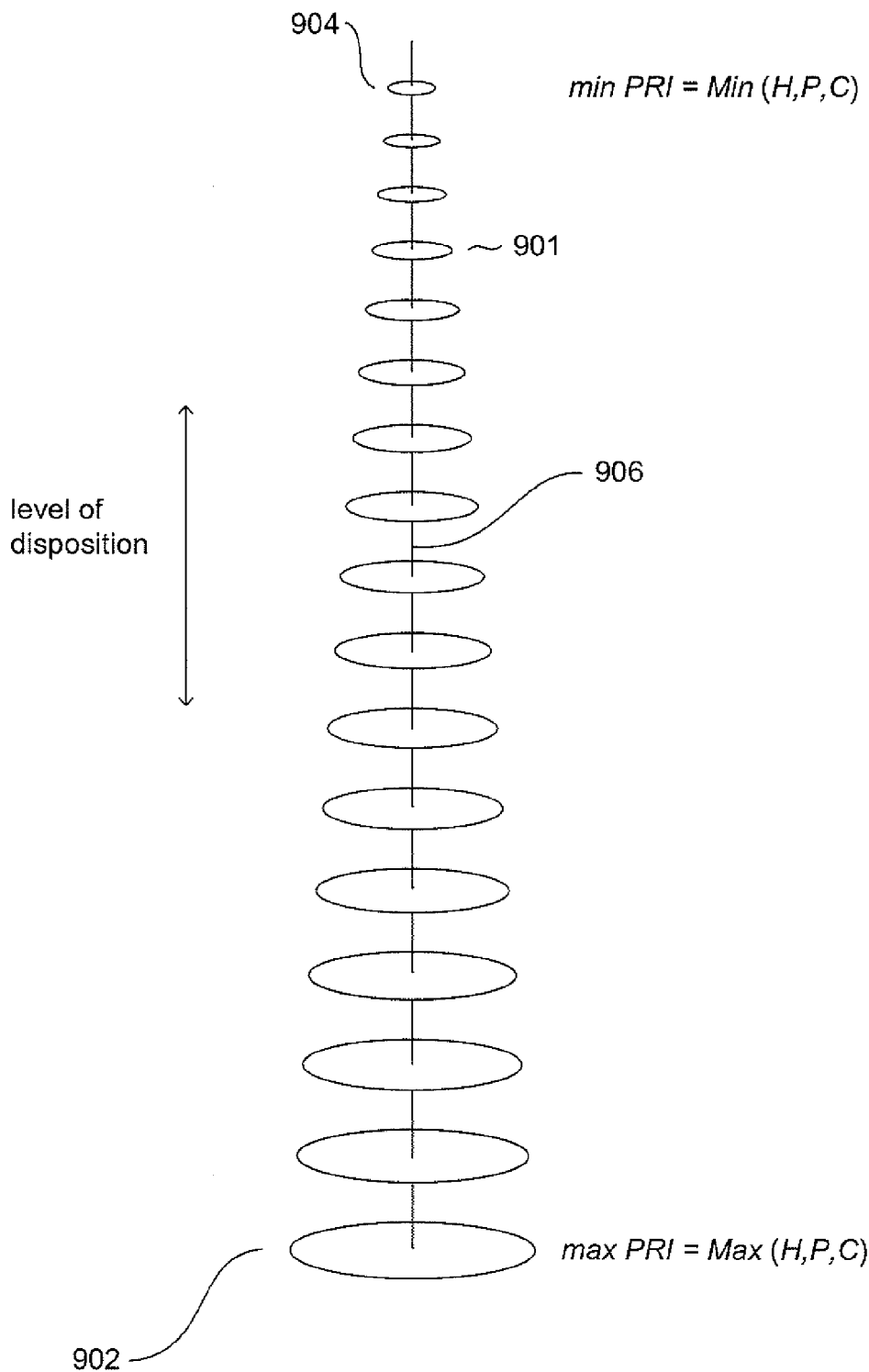
FIG. 9 illustrates the concept of a "level of disposition."

FIG. 9 illustrates the concept of a "level of disposition." In FIG. 9, each disk-like object, such as disk-like object 901, represents a particular LoD value, or, more particularly, a PRI computed from a particular LoD values. In general, LoDs are constrained to fall between a maximum LoD, represented by the maximally sized PRI 902, and a minimum LoD, represented by the minimally sized PRI 904. The maximum and minimum LoD can be computed based on the user's history, preferences, and the current context. A computed LOD, based on additional factors that may include current location, current time, projected location, projected time, various time-associated events, and other such factors, can then be thought of as falling within the range of possible LoD values within the range of LoD values between the maximally sized LoD 902 and minimally sized LoD 904, shown at intervals along an LoD axis 906. In other words, PRIs are generally bounded by maxima and minima, with ranges of possible values, and with particular values selected by a various parameters and characteristics that together specify a level of disposition.

Figure 10C:
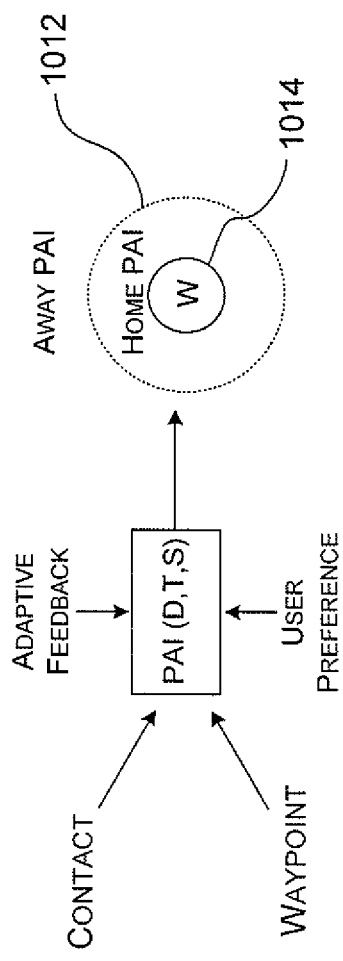
Figure 10D:
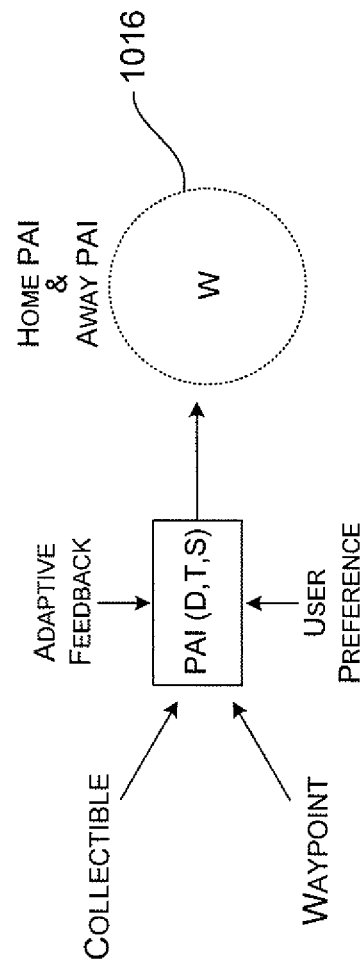

Next, three examples of PRI and location-based POI searching according to method and system embodiments of the present invention are provided, with reference to FIGS. 10A-13G. FIGS. 10A-D illustrate the types of PRI involved in these examples. In all three examples, the PRIs are personal areas of interest ("PAIs"), a special, two-dimensional case of the more general PRI. In general, PRIs are directly computed from LoDs, so LoD and PRI or PAI are used interchangeably. In general, as shown in FIG. 10A, the PAI 1002 is centered at a particular waypoint, or current or projected user location, W, and has an area determined by the distance of the waypoint W from the user's home, the time T recently spent by the user at the waypoint W, and the search criteria of the search for which the PAI is computed. In one example, as shown in FIG. 10 B, the PAI is computed to facilitate a search for food-related points of interest, and the area of the PAI ranges from a small area 1004 at locations distant from the user's home to a large area 1006, for a food-related search when the user is at home. The general concept is that a user is more willing to travel further, at home, than in distant locations in order to find a suitable restaurant. However, of course, this general concept may be modified, over time, by feedback 1008 collected as a user history, by explicitly specified or implicitly derived user preferences 1010, or by the passage of time should the user remain in a distant, non-home location In another example, as shown in FIG. 10C, a search is made for personal contacts, with the distance a user is willing to travel to meet a personal acquaintance or friend greater at a location distant from the user's home than at the user's home, reflected in the larger PAI 1014 for contact searches at distant locations than the smaller PAI 1014 for contact searches at home. In yet another example, as shown in FIG. 10D, the PAIs 1016 associated with distance locations and home locations have identical areas, suggesting that a user's willingness to find collectibles is generally location independent. Again, in the latter two examples, the PAI computation may also be directed by additional information, including history and preference information.

Figure 11A:
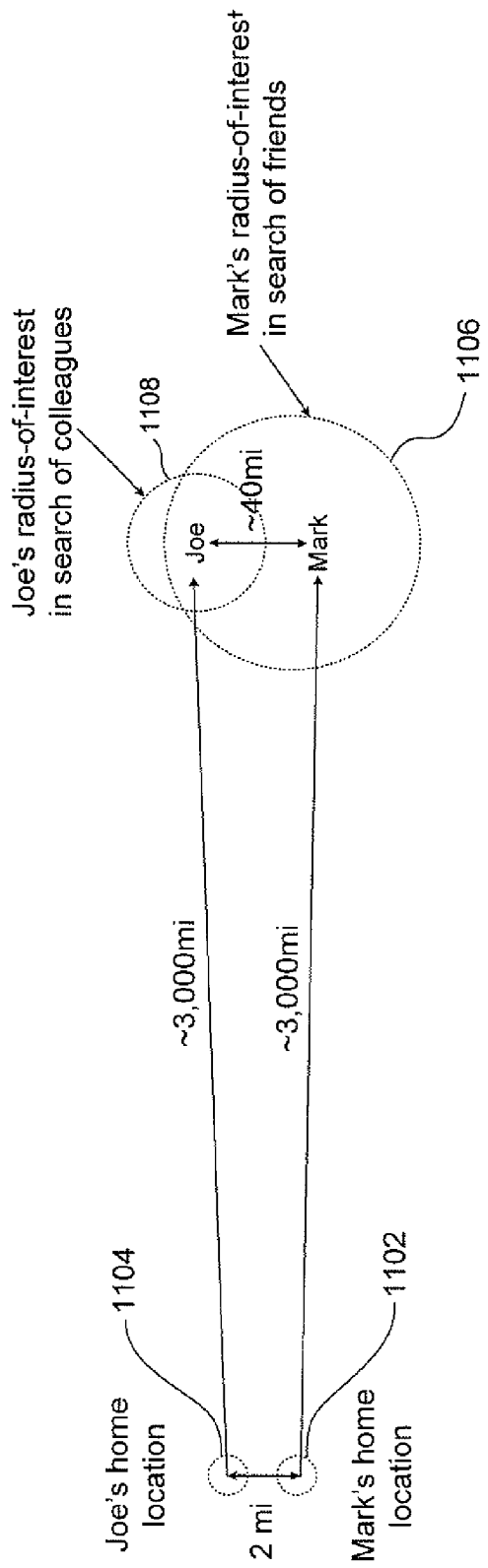

In a first example, introduced above with reference to FIG. 10C, two acquainted users Mark and Joe may search for personal contacts, including each other, both at their respective homes in Seattle and at a distant location, in the example Manhattan. FIGS. 11A-11I illustrate this exemplary contacts search. As shown in FIG. 11A, the PAIs at Mark's and Joe's homes 1102 and 1104 are smaller, in area, than the PAIs computed for Mark and Joe (1106 and 1108, respectively) at distant locations. In other words, the two acquaintances, who live within two miles of each other and who might get together occasionally when at home, are much more eager to meet when both happen to be in distant locations, even when, at the distant locations, they are separated by a considerably larger distance than the distance of separation of their homes.

A user-profile database contains tables or views that represent Mark's and Joe's level of relationship, as shown in FIGS. 11B-C. The level of relationship may be user-defined, adapted, and/or inferred from a degrees-of-separation analysis, for example. A degrees-of-separation analysis may be based on one or more user communities in which Mark and Joe participate, and subgroups within such communities to which Mark and Joe belong. A weight can be associated with each level of relationship factor, with respect to a contact search, and can also be user-defined, adapted, and/or inferred from a degrees-of-separation analysis of user communities in which Mark and Joe participate. FIG. 11D shows a table or view that represents both Mark's and Joe's weights associated with relationship factors. FIG. 11E shows a table or view that represents Mark's and Joe's base dispositions to meet an acquaintance or friend at various distances from home. These tables can be used to compute adjusted dispositions for Mark and Joe to meet people associated with different relationship factors, as represented by the tables or views shown in FIGS. 11F and 11G. The table or view shown in FIG. 11H indicates the radius for a computed PAI associated with different, possible level-of-disposition values. The PAI radii for a contact search initiated by Mark and Joe when both are in Manhattan are easily obtained from the above-described tables. In this example, Joe's disposition to meet any contact considered a "colleague" is 6, which corresponds to a PAI with a 32-mile radius. Mark's disposition to meet any contact considered as a "friend" is 7, which corresponds to a PAI with a 44-mile radius. In this scenario, a search for contacts by Joe in Manhattan would not return Mark, but a search for contacts by Mark in Manhattan would return Joe. Finally, the table or view shown in FIG. 11I indicates that, as Joe and Mark spend more time at the distant locations, their dispositions to meet contacts may decrease. For example, after 180 days, Mark's overall disposition to meet any contact identified as a "friend" is 3, which corresponds to a PAI with a 10-mile radius.

Figure 12A:
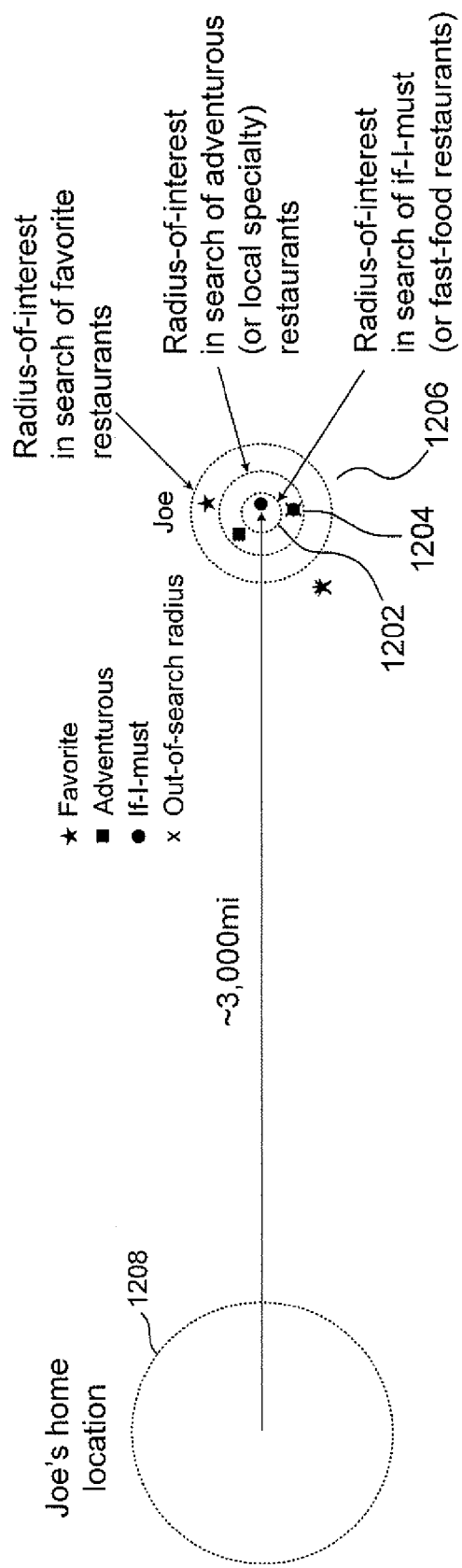

The second example, introduced with reference to FIG. 10B, concerns a search for food-related points of interest. FIGS. 12A-G illustrate this exemplary food-related POI search. As shown in FIG. 12A, PAIS 1202, 1204, and 1206 reflect searches for increasingly desirable types of food-serving establishments, and are all considerably smaller than the PAI for food-related POI searches at a user's home location 1208. FIG. 12B shows a table or view indicating categories of interest related to food-serving establishments. FIG. 12C shows a table or view representing disposition weights associated with each category of interest. FIG. 12D shows base dispositions with respect to selected distances from home. FIG. 12D shows the adjusted dispositions for the user Joe when in Manhattan for each category of interest, obtained by applying the base disposition of "1" for locations greater than 1500 miles from home, in the table or view shown in FIG. 12D, to the disposition weights for each category, in the table or view shown in FIG. 12C. The table or view shown in FIG. 12F shows PAI radii for walking or driving for each of 11 possible level of dispositions, and FIG. 12G shows the increase, over time, of disposition with time spent at a distant location. In this example, a search for food-serving establishments by Joe, directly after arriving in Manhattan, returns: (1) a fast-food chain right next door to the hotel that matches Joe's disposition of 0, corresponding to a PAI with a 50-foot radius; (2) a local specialty Italian restaurant that matches Joe's disposition of 3, corresponding to a PAI with an 800-foot radius; and (3) a Japanese restaurant, Todai, that matches Joe's disposition of 5, corresponding to a PAI with a 9-mile radius. The first two PAIs are based on walking to the restaurants, while the third is based on driving. However, after 3 days, Joe's overall disposition to seek his favorite restaurant Todai is 10, which corresponds to a PAI with a 3800-foot radius, when walking, and a PAI with a 26-mile radius, when driving.

Figures 13A, 13C:
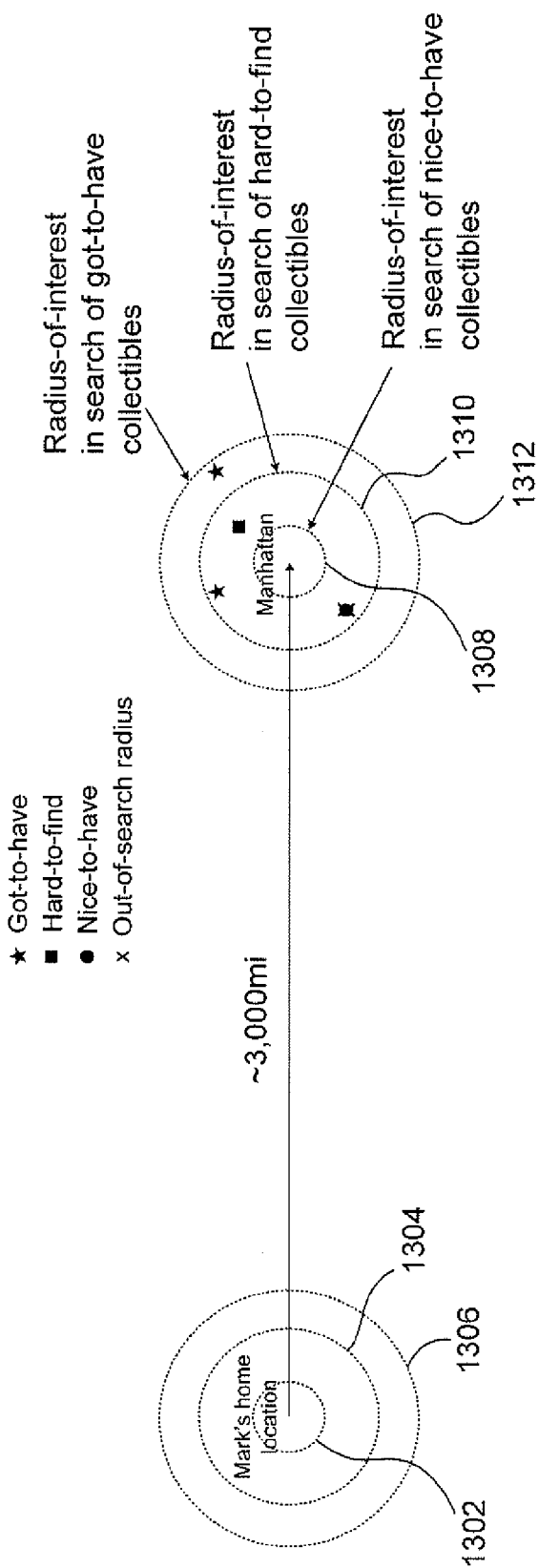

The third example, introduced with reference to FIG. 10D, concerns a search for collectibles. FIGS. 13A-G illustrate this exemplary collectibles-related POI search. In this example, as shown in FIG. 13A, the PAIs computed for various categories of collectibles at Mark's Seattle home location 1302, 1304, and 1306 are equal, in size, to PAIs computed for the same categories of collectibles at the distant location of Manhattan 1308, 1310, and 1312. The tables or views shown in FIGS. 13B and 13C include various categories of interest for collectibles and the disposition weights for the categories, respectively. The base disposition for collectibles is contained in the table or view shown in FIG. 13D, which, when applied to the disposition weights for various categories of interest, provide the adjusted dispositions for the categories of interest contained in the table or view shown in FIG. 13E. Radii of PAIs for various disposition levels are shown in FIG. 13F, and the static nature of the PAIs with respect to time spent at a location is reflected in the table or view shown in FIG. 13G. In this example, a search by Mark returns information regarding a rabbit's foot that matches Mark's disposition of 5, corresponding to a PAI with a 20-mile radius, information regarding a Ming-dynasty vase that matches Mark's disposition of 7, corresponding to a PAI with a 34-mile radius, and a Mona Lisa painting that matches Mark's disposition of 10, corresponding to a PAI with a radius of 105 miles.

Figure 14A:
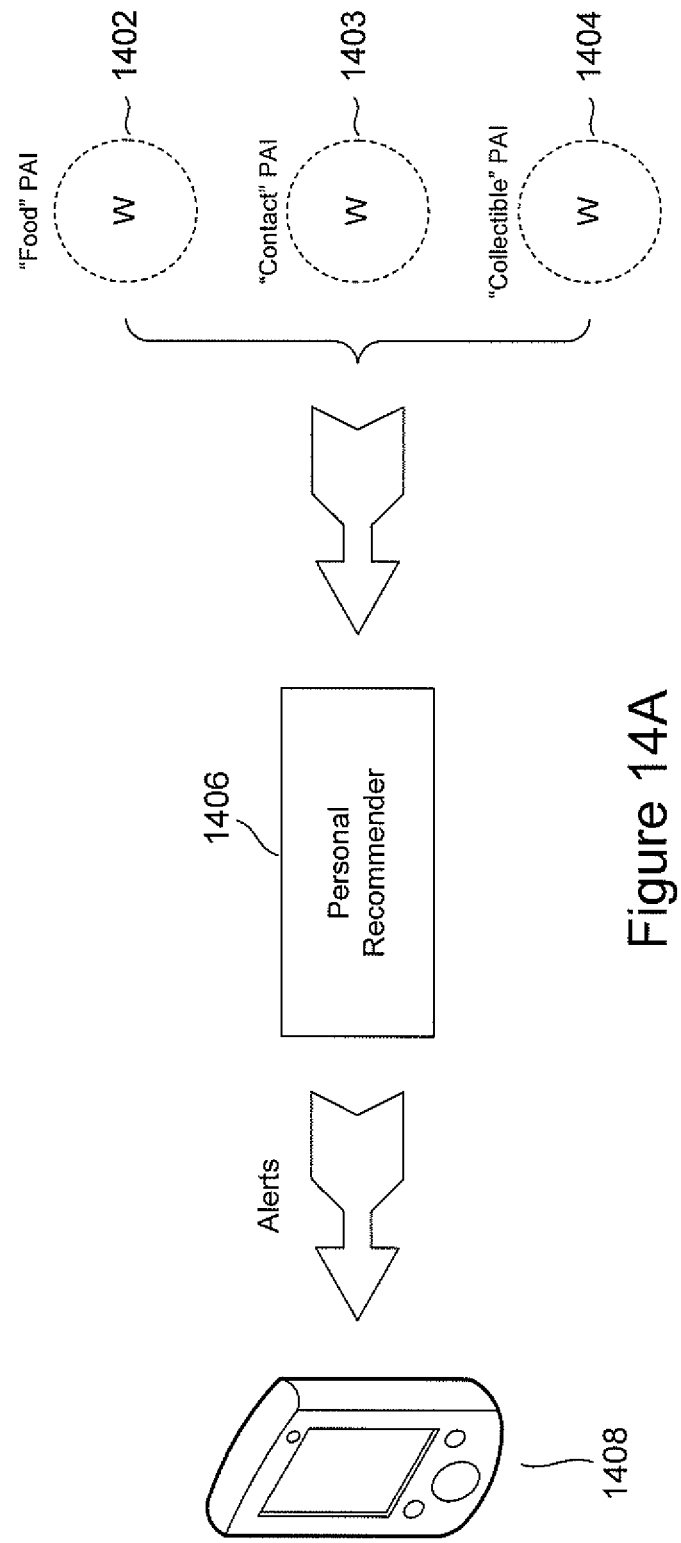
Figure 14B:
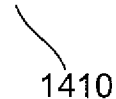

FIGS. 14A-C illustrates the concept of transient LoD modifiers to further refine contextual relevance. A more refined list of recommended POIs, referred to as a "personal recommender" ("PR"), may be generated based on one or more POI results, as shown in FIG. 14A. While a continuously evolving PRI generates highly relevant POI results to the user, there are aspects of contextual relevance that may dictate favorable choices based on circumstantial events and conditions, including traffic conditions, weather conditions, personal schedule constraints, and the start day and time of the event. Such transient aspects may influence and modify the user's LoD with respect to a particular event. As shown in FIG. 14A, consideration of the a user's various PAIs (1402-1404), and searches related to the PAIs that take into account LoDs modified by consideration of the above-mentioned circumstantial events and conditions results in a PR 1406, that can then be used, for example, to generate alerts 1408 to a user. FIG. 14B illustrates an example of the traffic modifier, where the final LoD may either increase or decrease depending on the current or projected transient traffic conditions. In the table 1410 shown in FIG. 14B, traffic congestion is represented by colors, with green representing a least-congested traffic state and black representing a most-congested traffic state. FIG. 14C illustrates an example of the weather modifier, where the final LoD may be either increased or decreased by the weather modifier related to a current or projected transient weather condition. The various modifiers can be either applied independently or as an aggregate to a base LoD. Transient modifiers can be numerical constants, or can be values generated by routines that are adaptable to a user's choices. Recommended POI lists that result from consideration of circumstantial events and conditions are generally more personalized and contextually relevant to the user.

FIGS. 15A-C illustrate an example of POI refinement based on contextual relevance. This example is also related to the search for collectibles. At the time Mark made plans to travel to Manhattan, the PAI for searching for collectibles, or items in Mark's wish list, is computed ahead of time, prior to Mark's departure. Information regarding stores, store locations, sale prices for specific items, and other information used for searching may be obtained prior to Mark's departure. Furthermore, if a collectible item is identified to be part of an auction event held a day before the projected day of Mark's arrival in Manhattan, the result returned by a search conducted in advance of Mark's trip may even influence Mark to change his travel plans in order to attend the auction.

A search conducted prior to Mark's departure may be based on the contents of Mark's wish list, Mark's travel schedule, Mark's personal-information-management profile, and auction-event review for Manhattan, Mark's level of disposition for certain items or item categories and the associated radius of interest, and many other items of information or types of interest accessible to the POI searching system. Optionally, a POI search may be initiated by an automated agent, implemented as a software, hardware, or firmware component, which acts on behalf of the user to continuously, or at regular intervals, search for POI based on user-defined, adapted or inferred search criteria. In the above-described examples, the LoD is a numerical value that can be used to sort various tables or items in order to identify POIs most relevant to a user. FIG. 15A shows a table that lists events, identified by a search based on Mark's personal preferences and other information of interest to Mark, sorted in descending associated-LOD order.

FIG. 15B shows the list of events shown in FIG. 15A reordered based on additional contextual information. In the table shown in FIG. 15B, and addition field "Status" is included, and the table has been instantiated for a time of 10:00 PM. As can be seen from the status values for the entries in the table, only the fast-food restaurant is currently open at 10:00 PM, while Mark's favorite restaurant, Todai, is currently closed. Therefore, the fast-food restaurant appears as the first entry, reflecting the fact that the fast-food restaurant is has the highest contextual relevance to the user based on the current time of the day.

As another example, at lunch time, the POI list may be updated by an agent to reflect new contextual information, including Joe's online status, the time of the day, and the close proximity of Joe and Mark to a restaurant. FIG. 15C shows the updated list of events. The order of entries in the updated table reflect the fact that a local specialty Italian restaurant is conveniently located close to both Mark and Joe, and that Mark has time to meet Joe, since the auction the auction opens at 2 PM.

FIGS. 15A-C illustrate that the same POI generated by the PAI may have different contextual relevance to the user at different times of the day. As the user takes the recommended suggestion or makes other choices, a POI searching system uses historical data and models the user's pattern of actions, locations, and choices. The pattern may be based on daily events, such as a daily commute route, weekly events, such as entertainment choices, and seasonal events, such as frequently visited vacation spots. The pattern is adaptive and becomes available to influence future POI search results.

Thus, the location-based POI searching methods and systems of the present invention consider stored information particular to a user, as well as a search context, to compute, for each search conducted on behalf of a user, a PRI within which POIs are selected for display to the user. In the above discussion, PRIs are circular, spherical, or hyperspherical, but, in alternative embodiments, may have other geometries and configurations. For example, PR's may be square or rectangular, when PRIs are defined by city-block distance, rather than by straight line distance. PRIs are not necessarily reflective of geographical areas, timeline distances, or metrics associated with other real-world spaces, since PRIs may be defined by many different types of constraints. For example, a PRI constrained by a maximum distance of 4 miles or by a maximum time of travel of 20 minutes may have outer boundaries that are quite non-circular, instead resembling an octopus with tentacles corresponding to major arterials or subway lines. As discussed above, a user's current location may be geographical, but also may be a location in time, or in other types of dimensioned spaces. The resulting recommended list of POIs produced by a POI search system may be further adapted, based on the contextual relevance to the user, to display POIs of particular relevance and in relevance order. The POI searching system may, for example, sort the POI from the highest to lowest desirability to the user. Sorting criteria may be derived from various context-related data, including historical user patterns, traffic and weather conditions, and other information stored for users and/or acquired from various information resources. Indications of various types may be used to indicate, to a user, the contextual relevancy of POIs found for the user, including ordering POIs by contextual relevancy, annotating displayed POIs with numeric or graphical indications of contextual relevancy, or by selecting only the most contextually relevant POIs from among contextually relevant POIs for display to a user.

Although the present invention has been described in terms of particular embodiments, it is not intended that the invention be limited to these embodiments. Modifications within the spirit of the invention will be apparent to those skilled in the art. For example, as discussed above, a large variety of different types of PRIs may be computed for a large variety of different types of location-based POI searches. Location-based POI searching systems that represent embodiments of the present invention may employ many different types of databases and stored data, may be implemented in hardware, software, firmware, or a combination of two or more hardware, software, and firmware, using different programming and circuit-design languages, modular organization, control structures, variables, and difference in other such design parameters. User profiles may include preferences, contacts, favorites, and wish lists. POIs may include retail establishments, friends, transient events, local entertainment and attractions, and myriad products and services. PRIs may be continuous and connected, or may be a collection of discreet, smaller continuous regions. A POI search may be user-initiated or carried out on behalf of a user by an automated agent. A user pattern may be specified as an input parameter to the POI searching system.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A location-based points-of-interest searching system comprising:
    four database components including a points-of-interest database component, a map database component, user-profiles database component, and a user-histories database component; and
    searching logic that
        receives a points-of-interest search request from a user,
        computes a personal region of interest with respect to the user and the received points-of-interest search request, the personal region of interest defining one of an area, volume, or hypervolume and computed as a function of the user's level of disposition towards the searched-for points of interest, the level of disposition towards the searched-for points of interest, in turn, computed from three or more of the user's current or projected location, the current date and time, a history of the user's location and interaction with the points-of-interest-searching system, including user-initiated searches and user selections from displayed search results, a user profile developed for, and continuously updated on behalf of, the user, and a current context for the search, as specified by a search query or by other context-specifying data, searches the points-of-interest database component for points of interest within the personal region of interest that meet two or more constraints, each computed from one or more of the current context for the search, data related to the user extracted from the user-histories database component, and data related to the user extracted from the user-profiles database component, and displays to the user, on a display device, one or more points-of-interest found by searching for points of interest within the personal region of interest.

2. The location-based points-of-interest search system of claim 1 wherein location-based points-of-interest searching system displays to the user, in addition to the one or more points-of-interest, an indication of contextual relevance, the indication of contextual relevance comprising one or more of:
an order in which the points of interest are displayed;
selection of certain points of interest among a larger number of points of interest for display; and
a numerical or graphical indication of the contextual relevance to a user to whom the results are displayed.

3. The location-based points-of-interest search system of claim 1 further including an agent that continuously, or at regular intervals, searches for points of interest and updates points of interest already found for a user on behalf of the user.

4. The location-based points-of-interest search system of claim 3 wherein the agent is implemented as one or more of:
a routine executed by a processor;
a network-mobile executable routine executed by a processor;
firmware; and
hardware.

5. The location-based points-of-interest search system of claim 1 wherein contextual relevance may be determined from one or more of:
a stored history of a user's selections;
a stored history of a user's actions;
a stored history of a user's locations;
current environmental conditions;
projected environmental conditions;
current traffic conditions;
projected traffic conditions;
a user's projected schedule of locations;
a user's projected schedule of actions;
a user's projected schedule of travel;
a user's projected schedule of purchases;
the current date;
a projected date;
the current time; and
a projected time.

6. The location-based points-of-interest searching system of claim 1
wherein the area, volume, or hypervolume is an area within a two-dimensional domain, volume within a three-dimensional domain, or hypervolume in a domain defined by four or more dimensions; and
wherein the dimensions are selected from spatial and temporal dimensions.

7. The location-based points-of-interest searching system of claim 1 further comprising one or more additional database components selected from among a time-associated-events database component, a degrees-of-separation database component, and other database components that store information that facilitates location-based points-of-interest searching.

8. A method for searching for points of interest on behalf of a user, the method carried out by a location-based points-of-interest searching system that has four database components including a points-of-interest database component, a map database component, user-profiles database component, and a user-histories database component, the method comprising:
receiving a points-of-interest search request from a user,
computing a personal region of interest with respect to the user and the received points-of-interest search request, the personal region of interest defining one of an area, volume, or hypervolume and computed as a function of the user's level of disposition towards the searched-for points of interest, the level of disposition towards the searched-for points of interest, in turn, computed from three or more of the user's current or projected location, the current date and time, a history of the user's location and interaction with the points-of-interest-searching system, including user-initiated searches and user selections from displayed search results, a user profile developed for, and continuously updated on behalf of, the user, and a current context for the search, as specified by a search query or by other context-specifying data,
searches the points-of-interest database component for points of interest within the personal region of interest that meet two or more constraints, each computed from one or more of the current context for the search, data related to the user extracted from the user-histories database component, and data related to the user extracted from the user-profiles database component, and
displaying to the user, on a display device, one or more points-of-interest found by searching for points of interest within the personal region of interest.

9. The method of claim 8 further including displaying to the user, in addition to the one or more points-of-interest, an indication of contextual relevance, the indication of contextual relevance comprising one or more of:
an order in which the points of interest are displayed;
selection of certain points of interest among a larger number of points of interest for display; and
a numerical or graphical indication of the contextual relevance to a user to whom the results are displayed.

10. The method of claim 8 further including searching, by an agent, continuously or at regular intervals, for points of interest and updating points of interest already found for a user on behalf of the user.

11. The method of claim 8 wherein the agent is implemented as one or more of:
a routine executed by a computer;
a network-mobile routine executed by a mobile phone;
firmware; and
hardware.

12. The method of claim 8 wherein contextual relevance may be determined from one or more of:

a stored history of a user's selections;
a stored history of a user's actions;
a stored history of a user's locations;
current environmental conditions;
projected environmental conditions;
current traffic conditions;
projected traffic conditions;
a user's projected schedule of locations;
a user's projected schedule of actions;
a user's projected schedule of travel;
a user's projected schedule of purchases;
the current date;
a projected date;
the current time; and
a projected time.

13. The method of claim 8
wherein the area, volume, or hypervolume is an area within a two-dimensional domain, volume within a three-dimensional domain, or hypervolume in a domain defined by four or more dimensions; and
wherein the dimensions are selected from spatial and temporal dimensions.

14. The method of claim 8 wherein the location-based points-of-interest searching system has one or more additional database components selected from among a time-associated-events database component, a degrees-of-separation database component, and other database components that store information that facilitates location-based points-of-interest searching.

* * * * *